Figure 1:
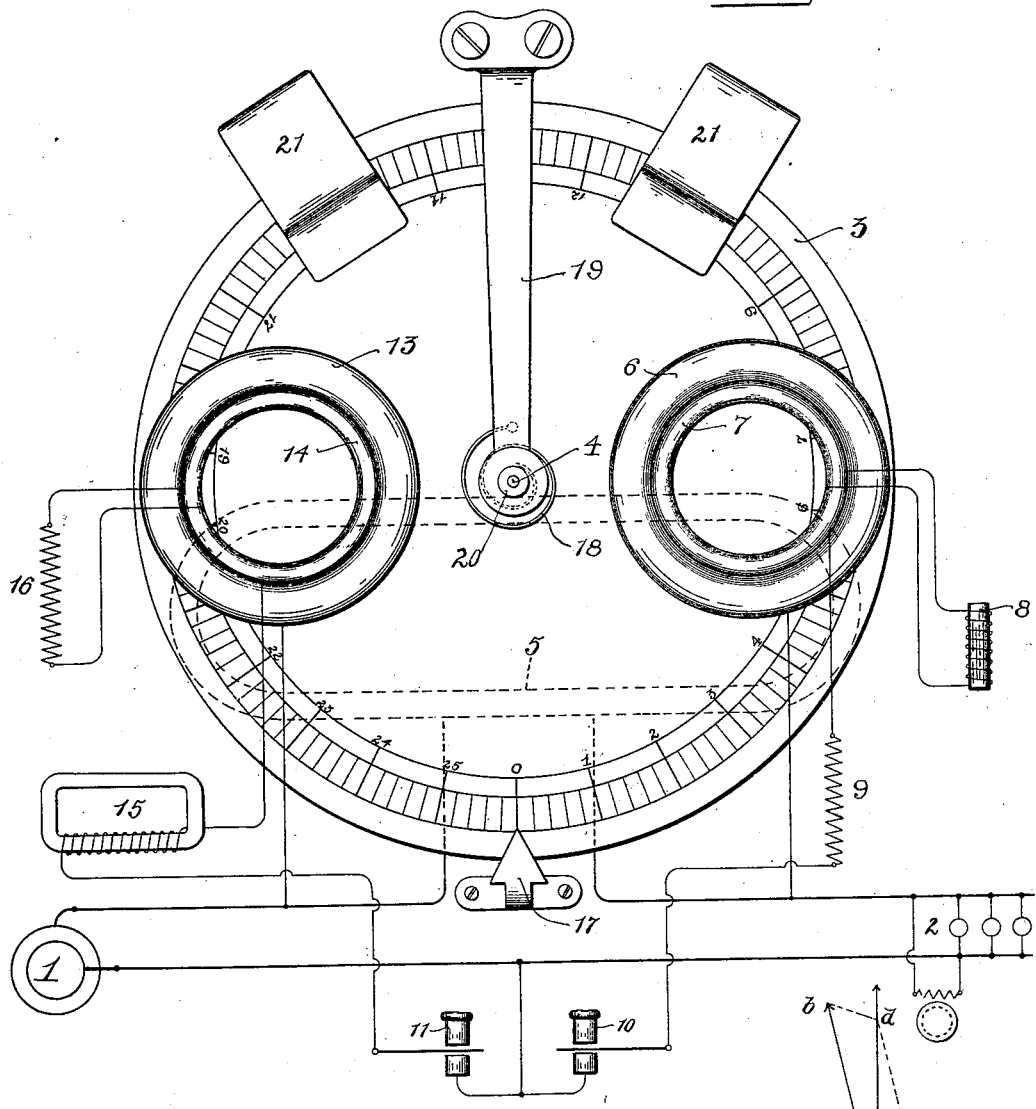

No. 698,671. Patented Apr. 29, 1902.
T. DUNCAN.
ALTERNATING CURRENT METER.
(Application filed Nov. 18, 1899. Renewed Dec. 16, 1901.)

(No Model.)

Witnesses
Max W. Zabel.
C. E. Hubert.

Inventor
Thomas Duncan
By Charles A. Brown & Cragg
Attorneys.

UNITED STATES PATENT OFFICE.

THOMAS DUNCAN, OF CHICAGO, ILLINOIS, ASSIGNOR TO THE SIEMENS & HALSKE ELECTRIC COMPANY OF AMERICA, OF CHICAGO, ILLINOIS, A CORPORATION OF ILLINOIS.

ALTERNATING-CURRENT METER.

SPECIFICATION forming part of Letters Patent No. 698,671, dated April 29, 1902.

Application filed November 18, 1899. Renewed December 16, 1901. Serial No. 86,058. (No model.)

*To all whom it may concern:*

Be it known that I, THOMAS DUNCAN, a citizen of the United States, residing at Chicago, in the county of Cook and State of Illinois, have invented a certain new and useful Improvement in Alternating-Current Meters, (Case No. 321,) of which the following is a full, clear, concise, and exact description, reference being had to the accompanying drawings, forming a part of this specification.

My invention relates to alternating-electric-current meters, and has for its object the construction of a meter that will accurately measure in alternating-current power-circuits the "real" watts and the wattless or magnetizing component of the current, and more specifically is an improvement upon the invention disclosed in my application, Serial No. 737,424, filed of even date herewith. I am enabled by means of the invention disclosed in my aforesaid application to employ a single indicator or other measuring device that is capable of effecting the measurement of either of these load conditions, two complete sets of motive coils, however, being there employed. In my present invention I employ but one complete set of motive windings, a single series coil being in coöperative relation with two shunt-windings. I am enabled to measure the real watts and the wattless or magnetizing component of the current in an alternating-current power-circuit by means of the same instrument. Heretofore it was necessary to determine the wattless or magnetizing component mathematically.

Generally speaking, my invention comprises a measuring element, means for producing pressure-fields in phase and in quadrature, a single current-coil in coöperative relation with said means, and means for controlling the coöperative relation between the windings and the measuring element to secure the desired measurements. With one adjustment of the controlling means the measuring element is actuated to determine the "true" watts, while with another adjustment the measuring element is actuated to determine the wattless or magnetizing component.

In applications, Serial Nos. 730,847, 730,848, and 730,849, filed September 18, 1899, and Serial No. 733,290, filed October 11, 1899, I have shown and described means for and a method of measuring the magnetizing or so-called "wattless" component in alternating-current power-circuits by means of induction motor-meters, while in applications, Serial Nos. 735,807 and 735,808, filed November 4, 1899, I have shown how the same result might be accomplished by means of a meter carrying field-windings upon the armature.

In practicing my invention I employ means capable of causing some of the windings to create fields which act upon the measuring element to effect the measurement of the true watts and others to create fields which act upon the measuring element to effect the measurement of the wattless component.

In practicing my invention I may employ an induction motor-meter; but I do not wish to be limited to the precise form of meter employed.

I will more fully describe my invention by reference to the accompanying drawings, showing one embodiment thereof, in which—

Figure 2:
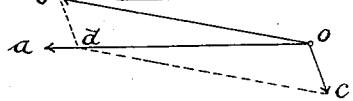
Figure 3:
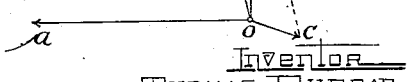

Figure 1 shows an induction type of indicating motor-meter constructed and arranged in accordance with the invention. Figs. 2 and 3 are vector diagrams showing the phase relations of the magnetism due to the pressure-windings with the pressure.

An alternating-current generator 1 is shown as supplying current to the translating devices 2. A disk armature 3, preferably made of aluminium, is suitably mounted upon the rotating spindle 4. At one side of the disk is secured a single series field-coil 5, (shown underneath the disk,) which coil is connected in series with a main and is traversed by the current supplied to the translating devices. The current sets up a magnetic field in said coil 5 that is proportional to the current strength. Two coils 6 and 7 are shown above the disk 3 and eccentric with respect to coil 5, the coil 7 being in series with an impedance-coil 8, while the coil 6 is in series with a non-inductive resistance 9. The coils described are jointly capable of exerting a torque upon the armature 3 which is proportional to the current times the electromotive force times the sine of the angle of lag. A key or switch 10 serves to include the coil 6 with its resistance 9 in bridge between the main conductors. The arrangement of the coils 6 and 7 is such that when the key 10 is depressed they may jointly produce a magnetic field that is in phase with the electromotive force between the main leads. There will then be no shifting field between the series coil 5 and the compound coil 6 7 when the translating devices are non-inductive or when the current in the leads is in phase with its electromotive force; but as the current lags in the work-circuit the torque will increase proportionately until a lag of ninety degrees is reached, when the torque will reach its maximum. This will be understood by reference to Fig. 2, where $o\,a$ may represent the impressed electromotive force; $o\,b$, the current and magnetism of the coil 6; $o\,c$, the current and magnetism of the coil 7, and $o\,d$ the resultant magnetism of the coils 6 and 7, which resultant magnetism is in phase with the impressed electromotive force. Other means than those shown may be devised for bringing the resultant magnetism due to the coils 6 and 7 in phase with the impressed electromotive force. The non-inductive resistance 9 is employed for the purpose of keeping the phase of the current $o\,b$ as nearly as possible in phase with the electromotive force $o\,a$. The inductance 8 is employed to cause the current through the coil 7 to lag as much as possible beyond one hundred and eighty degrees behind the electromotive force $o\,a$.

The portion of the instrument that I have thus far described is capable of measuring the wattless component in alternating-current circuits when the key 10 is depressed. If it should be desired to measure the true watts in an alternating-current circuit, the key 10 is released and the key 11 is depressed to operatively associate other motor-coils corresponding to the key with the armature 3, these coils then acting upon the said armature in conjunction with the series coil 5 to exert thereon a torque which is proportional to the current times the electromotive force times the cosine of the angle of lag. Above the disk and also eccentric with respect to the coil 5 are placed the coils 13 and 14, which are adjacent to the coils 6 and 7, the series coil 5 being common to all of the coils 6, 7, 13, and 14. The resultant magnetism due to the current in the coils 13 and 14 is maintained in quadrature with the impressed electromotive force, the phase relations being indicated in Fig. 3, where $o\,a$ represent the impressed electromotive force or pressure; $o\,b$, the current and magnetism of the coil 13; $o\,c$, the current and magnetism of the coil 14, and $o\,d$ the resultant magnetism due to the currents in the coils 13 and 14, the resultant magnetism being in quadrature with the impressed electromotive force. The current in the coil 13 is lagged behind the electromotive force by including in its circuit the inductance 15, and the magnitude of the current in the coil 14 is regulated by the adjusting resistance 16. The switches 10 and 11 are preferably so constructed that they normally maintain the pressure-coils out of circuit with the main conductors, so that there is normally no torque exerted upon the armature.

The operation of the apparatus will now be readily understood. If it should be desired to measure the wattless component of alternating current in a system of distribution, key 10 is actuated to close circuit through the coil 6, the resultant field due to the coils 6 and 7 coöperating with the field due to the series winding 5 to produce a torque upon the armature that varies as the sine of the angle of lag between the current and pressure with a given amperage and voltage. If it should be desired to measure the true watts of alternating current in a system of distribution, key 11 is alone depressed to include the coil 13 in bridge of the supply-mains. The currents in the coils 5, 13, and 14 cause a torque that varies as the cosine of the angle of lag between the current and electromotive force with a given amperage and voltage.

I have shown an armature as being provided with a scale marked off upon its periphery, a stationary pointer 17 being employed to indicate the extent of movement of the armature. A spiral spring 18 is fastened at one end to a support 19, while the other end is fastened to the hub 20 of the armature to cause the instrument to act as an indicating device. To cause the armature to be deadbeat, permanent magnets 21 21 are employed.

While I have shown keys for controlling the connections of pressure-coils of the motor-windings, I do not wish to be limited to this precise means for controlling the operation of the apparatus, as other means may be devised.

Modifications may readily be made in the apparatus of my invention without departing from its spirit, and I do not, therefore, wish to be limited to the precise embodiment shown; but,

Having thus described my invention, I claim as new and desire to secure by Letters Patent—

1. In an alternating-current meter, the combination with a measuring element, of pressure-windings, a current-coil common to both pressure-windings, said windings serving to produce torques upon the measuring element proportional to the "true" watts and to the magnetizing component, and means for limiting the measuring element to the action of one of the torques, substantially as described.

2. In an alternating-current meter, the combination with a measuring element, of pressure-windings, a current-coil common to both pressure-windings, said windings serving to produce torques upon the measuring element proportional to the "true" watts and to the magnetizing component, and means for permitting said element to be subject to either torque alone, substantially as described.

3. In an alternating-current meter, the combination with a measuring element, of pressure-windings, a current-coil common to said pressure-windings, said windings serving to cause torques upon the measuring element proportional to the "true" watts and to the magnetizing component, and switching mechanism for rendering a pressure-winding ineffective, substantially as described.

4. In an alternating-current meter, the combination with a measuring element, of pressure-windings, a current-coil common to said pressure-windings, said windings serving to cause torques upon the measuring element proportional to the "true" watts and to the magnetizing component, and switching mechanism for rendering either pressure-winding ineffective, substantially as described.

5. In an alternating-current meter, the combination with a measuring element, of pressure-windings, a current-coil common to said pressure-windings, said windings serving to cause torques upon the measuring element proportional to the "true" watts and to the magnetizing component, and switching mechanism adapted to open a pressure-winding circuit, substantially as described.

In witness whereof I hereunto subscribe my name this 14th day of November, A. D. 1899.

THOMAS DUNCAN.

Witnesses:
JAMES DALTON,
WM. F. MEYER.